US006708832B1

(12) United States Patent  (10) Patent No.: US 6,708,832 B1
Hannon  (45) Date of Patent: Mar. 23, 2004

(54) DEVICE FOR HANGING OBJECTS ON A VERTICAL SUPPORT

(76) Inventor: Shawn Hannon, 9140 S. 51st St., Franklin, WI (US) 53132

( * ) Notice: Subject to any disclaimer, the term of this patent is extended or adjusted under 35 U.S.C. 154(b) by 0 days.

(21) Appl. No.: 09/694,420

(22) Filed: Oct. 23, 2000

(51) Int. Cl.[7] ................................................. A47F 5/08
(52) U.S. Cl. ....................... 211/107; 182/187; 211/102
(58) Field of Search .............................. 211/107, 112, 211/6, 85.23, 100, 102; 182/187, 182, 82; 108/152, 135; 248/218.4, 219.4, 317, 318, 216.1

(56) References Cited

U.S. PATENT DOCUMENTS

| 118,241 | A | * | 8/1871 | Herreman's | ................. | 211/107 |
| 525,461 | A | * | 9/1894 | Johnson | ..................... | 108/152 |
| 530,349 | A | * | 12/1894 | Payne | ......................... | 108/135 |
| 561,664 | A | * | 6/1896 | Hollister | ..................... | 211/107 |
| 772,895 | A | * | 10/1904 | Miller | ......................... | 211/112 |
| 903,593 | A | * | 11/1908 | Lowendahl | ................. | 211/110 |
| 1,267,046 | A | * | 5/1918 | Beaird | ....................... | 108/135 |
| 1,365,150 | A | * | 1/1921 | Brown | ......................... | 211/107 |
| 1,457,066 | A | * | 5/1923 | Kestner | .................... | 248/240.3 |
| 1,473,318 | A | * | 11/1923 | Ranson | ...................... | 211/110 |
| 1,628,623 | A | * | 5/1927 | Jonnes | .................... | 248/230.8 |
| 1,798,613 | A | | 3/1931 | Manson | | |
| 1,809,018 | A | * | 6/1931 | Bruning | ..................... | 248/214 |
| 1,893,702 | A | * | 1/1933 | Glenn | .................... | 248/218.4 |
| 2,191,075 | A | * | 2/1940 | Hogan | ........................ | 211/107 |
| 2,414,538 | A | | 1/1947 | Lamb | | |
| 2,964,200 | A | * | 12/1960 | King | .......................... | 211/108 |
| 3,030,160 | A | | 4/1962 | Tandy | | |
| 3,115,213 | A | * | 12/1963 | Cloutier | ..................... | 182/187 |
| 3,749,200 | A | | 7/1973 | Meyer | | |
| 3,817,394 | A | * | 6/1974 | Saiki | ......................... | 211/110 |
| 3,978,612 | A | * | 9/1976 | Young | ........................ | 248/208 |
| 4,113,057 | A | * | 9/1978 | Bessinger | ................... | 182/187 |
| 4,113,058 | A | * | 9/1978 | Kobosh | ....................... | 182/187 |
| 4,415,137 | A | * | 11/1983 | Garves | ........................ | 248/629 |
| 4,452,336 | A | * | 6/1984 | Sickler | ......................... | 182/82 |
| 4,597,473 | A | | 7/1986 | Peck | | |
| 4,721,183 | A | * | 1/1988 | Koniecka | .................... | 182/182 |
| 4,722,421 | A | | 2/1988 | Hilbert | | |
| 4,867,273 | A | * | 9/1989 | Schaevitz | ................... | 182/116 |
| 5,078,232 | A | | 1/1992 | Hancosky | | |
| 5,205,375 | A | * | 4/1993 | Shriver | ....................... | 182/187 |
| 5,220,744 | A | | 6/1993 | Kendall | | |
| 5,263,675 | A | * | 11/1993 | Roberts et al. | .......... | 248/219.4 |
| 5,292,014 | A | | 3/1994 | Lelong | | |
| 5,313,910 | A | | 5/1994 | Wittman | | |
| D348,215 | S | | 6/1994 | Melhorn | | |
| 5,355,974 | A | | 10/1994 | Miller | | |
| 5,395,081 | A | | 3/1995 | Vollink | | |
| 5,427,344 | A | | 6/1995 | Beauchemin | | |
| 5,457,911 | A | | 10/1995 | Vollink | | |
| 5,538,101 | A | | 7/1996 | Kempf | | |
| 5,590,738 | A | * | 1/1997 | Hunt et al. | ................. | 182/116 |
| 5,649,257 | A | | 7/1997 | Kempka | | |
| 5,727,760 | A | * | 3/1998 | Wytovak et al. | ......... | 248/217.3 |
| 5,775,464 | A | | 7/1998 | Gardner | | |
| 5,820,455 | A | * | 10/1998 | Breedlove | ................... | 452/187 |
| RE36,276 | E | * | 8/1999 | Smith | ......................... | 182/187 |
| 5,966,865 | A | | 10/1999 | Jones | | |
| 6,164,604 | A | * | 12/2000 | Cirino et al. | .............. | 248/74.3 |
| 6,202,964 | B1 | * | 3/2001 | Thornhill | ................. | 248/219.4 |
| 6,264,000 | B1 | * | 7/2001 | Johnson | ..................... | 182/136 |

* cited by examiner

Primary Examiner—Daniel P. Stodola
Assistant Examiner—Khoa Tran
(74) Attorney, Agent, or Firm—Boyle Fredrickson Newholm Stein & Gratz S.C.

(57) ABSTRACT

A hanging device is provided for hanging an object on a vertical support. The hanging device includes a girding member having first and second sides. The first side of the girding member has a pair of spaced nubs projecting therefrom which defines a gaps. A first support member includes a first end having a portion pivotably receivable in the gap and a second end. A second support member extends between the first support member and the vertical support.

20 Claims, 3 Drawing Sheets

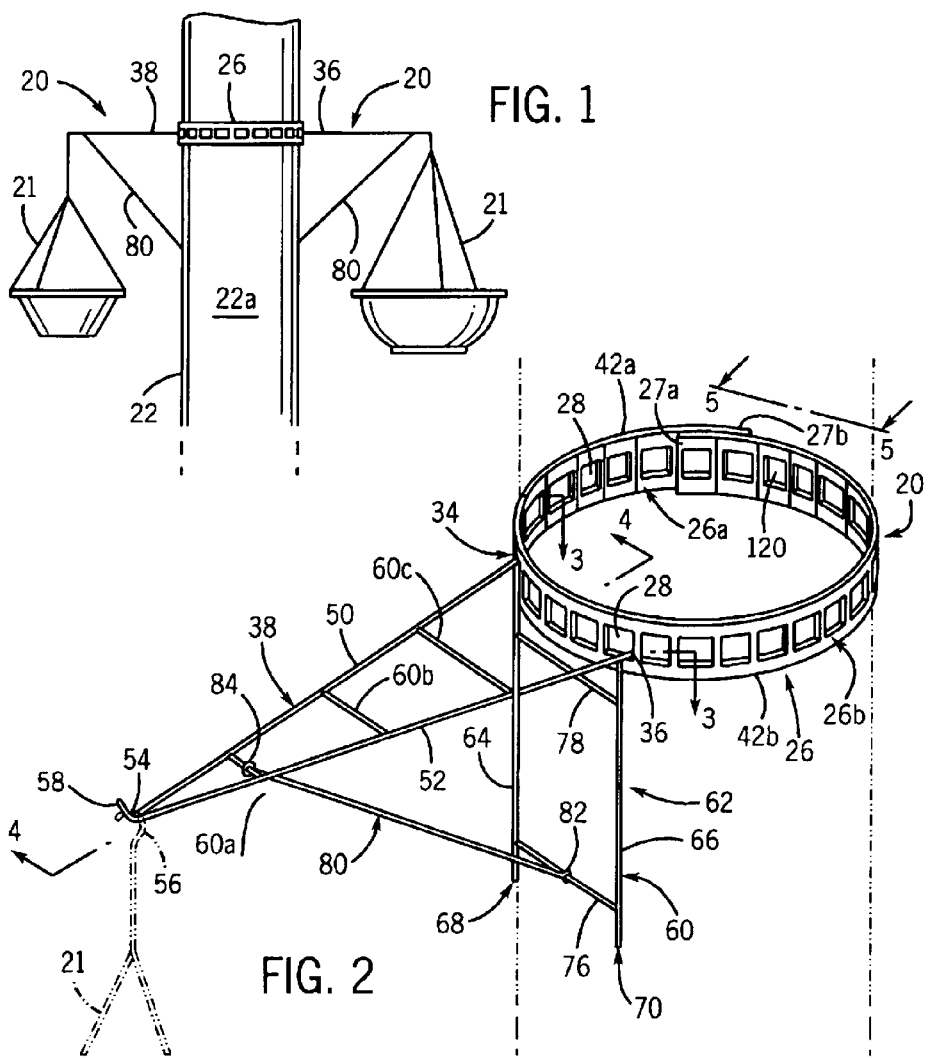
FIG. 1
FIG. 2
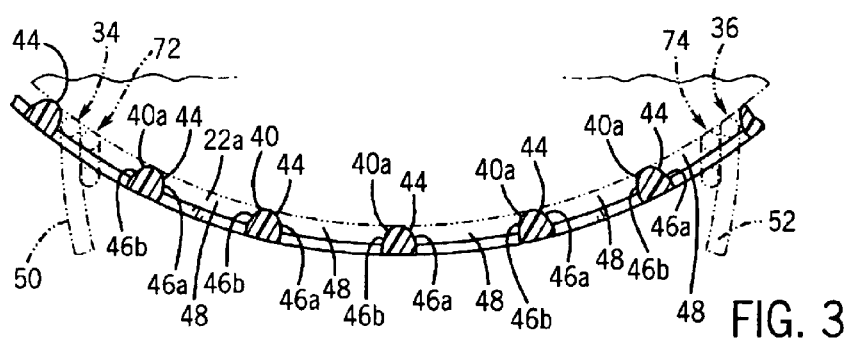
FIG. 3

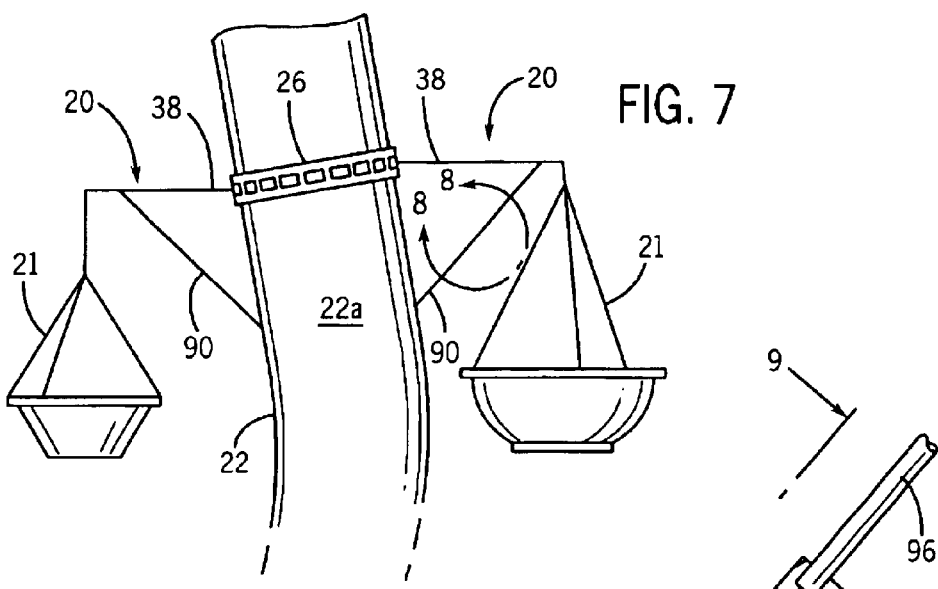
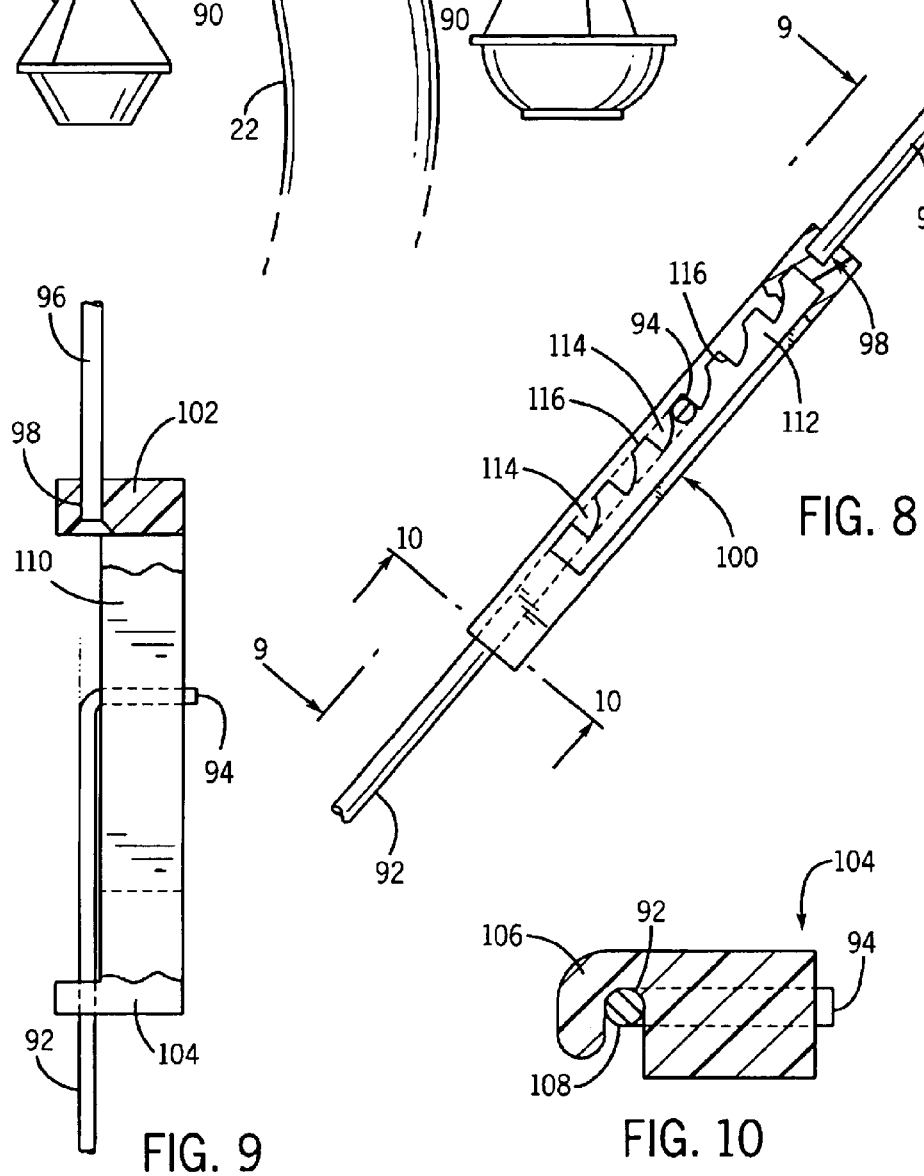

DEVICE FOR HANGING OBJECTS ON A VERTICAL SUPPORT

FIELD OF THE INVENTION

This invention relates generally to hanging devices, and in particular, to a device for hanging an object on a vertical support.

BACKGROUND AND SUMMARY OF THE INVENTION

Most people who live in homes with yards seek to beautify the yards through creative landscaping. In addition to grass and flowers, urban landscapes often include vertical supports such as trees, lamp posts, flag poles, or the like. These types of vertical supports often lack horizontal, visual interest at the eye level. It can be appreciated that by providing additional objects such as bird houses, bird feeders, wind chimes and hanging planters on such vertical supports, the aesthetic appearance of the vertical supports and the landscaped area may be improved.

For a variety of reasons, it may not be desirable or practical to attach horizontal supporting arms directly onto the vertical support. For instance, an owner may not want to damage the tree or provide entry sites for insects or disease by boring into the bark of the tree. Alternatively, the vertical support may be constructed from a material such as metal which makes attachment thereto difficult and time consuming. As a result, it is highly desirable to provide a device for hanging objects which may be interconnected to a vertical support without the need to penetrate the outer surface thereof.

By way of example, Lelong, U.S. Pat. No. 5,292,014, discloses a device for hanging an object on a vertical support on a tree. The device shown in the Lelong '014 patent includes a horizontal support having a first end for engaging the vertical support and a second, opposite end radially spaced from the vertical support. A strap is tightly wrapped around the vertical support. A cable interconnects the second end of the horizontal support to the strap so as to allow an item such as a flower basket to hang from the second end of the horizontal support.

While functional for its intended purpose, it can be appreciated that the strap or the inner end of the horizontal support disclosed in the Lelong '014 patent may damage the outer surface of the vertical support if the item hung on the outer end of the horizontal support is of substantial weight. Consequently, it is highly desirable to provide a device for hanging items on a vertical support which does not damage the vertical support during use. It is also noted that the horizontal support disclosed in the Lelong '014 patent must be substantially perpendicular to the vertical support, thereby limiting use of such a structure to certain applications.

Therefore, it is a primary object and feature of the present invention to provide a device for hanging items on a vertical support which does not penetrate the outer surface of the vertical support.

It is a further object and feature of the present invention to provide a device for hanging items on a vertical support which projects therefrom at various, user selected angular orientations thereto.

It is a still further object and feature of the present invention to provide a device for hanging items on a vertical support which may be easily mounted and/or removed from the vertical support.

It is a still further object and feature of the present invention to provide a device for hanging items on a vertical support which is simple and inexpensive to manufacture.

In accordance with the present invention, a device is provided for hanging objects from a vertical support. The device includes a girding member, a first support member, and a second support member. The girding member has first and second sides with the first side having a pair of spaced nubs projecting therefrom which define a gap. The first support member includes a first end having a portion pivotably receivable in the gap and a second end. The second support member extends between the first support member and the vertical support.

The girding member has a first end and second end. A connecting device interconnects the ends of the girding member to maintain the girding member on the vertical support. The girding member may also include a third nub projecting from the first side thereof so as to partially define a second gap. In this way, the first end of the first support member may have two portions which are pivotably receivable in corresponding gaps. The first and second portions of the first end of the first support member are interconnected by a cross-member. An attachment structure detachably connects the cross-member and the second support member. A hook may be provided at the second end of the second support member to support the object to be hung.

In accordance with a further aspect of the present invention, a landscape apparatus is provided for hanging an object on a vertical support. The landscape apparatus includes a strap for encircling the vertical support. The strap has an inner surface with at least two spaced protrusions projecting therefrom for engaging the vertical support. An elongated support includes a first end having a portion receivable between the projections and a second end. A bracing member extends between the vertical support and the elongated support.

A tension device may be interconnected to the strap for adjustably and releasably mounting the strap about the vertical support. A vertical member depends from the strap and has a receptor for receiving an end of the bracing member. The bracing member is extendible between a first retracted configuration and a second extended configuration. The bracing member may include a hook for pivotably interconnecting the bracing member to the elongated support. The second end of the elongated support also may include a hook for supporting the object to be hung.

In accordance with a still further aspect of the present invention, a landscape apparatus is provided for hanging an object on a vertical support. The landscape apparatus includes a support arm having a first connecting end and a second hooked end for receiving the object to be hung thereon. A belt member extends about the vertical support so as to capture the first connecting end of the support arm and to pivotably connect the support arm to the vertical support. A pendant support member depends from the belt member and has at least one receptor. An adjustable bracing member extends between the receptor of the pendant support member and the support arm for maintaining the support arm in a user selected position.

A plurality of projections extend from the first side of the belt member and engage the vertical support. The projections define first and second gaps between the belt member and the vertical support. The connection end of the support arm includes first and second spaced connection elements. Each connection element is receivable in a corresponding gap so as to allow the support arm to pivot with respect to the vertical support. It is contemplated that the vertical support arm be generally V-shaped. A clamping mechanism is interconnected to the belt member for retaining the belt member on a vertical support.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is a side elevational view of two hanging devices in accordance with the present invention mounted on a vertical support.

FIG. 2 is an isometric view of the hanging device of the present invention;

FIG. 3 is a cross-sectional view of the hanging device of the present invention taken along line 3—3 in FIG. 2;

FIG. 7 is a side view, similar to FIG. 1, showing two hanging devices in accordance with the present invention mounted on a non-vertical support;

FIG. 8 is a sectional view of the hanging device of the present invention taken along line 8—8 of FIG. 7;

FIG. 9 is a sectional view of the hanging device of the present invention taken along line 9—9 of FIG. 8; and FIG. 10 is a cross-sectional view of the hanging device of the present invention taken along line 10—10 of FIG. 8.

DETAILED DESCRIPTION OF THE PREFERRED EMBODIMENTS

Figure 4:
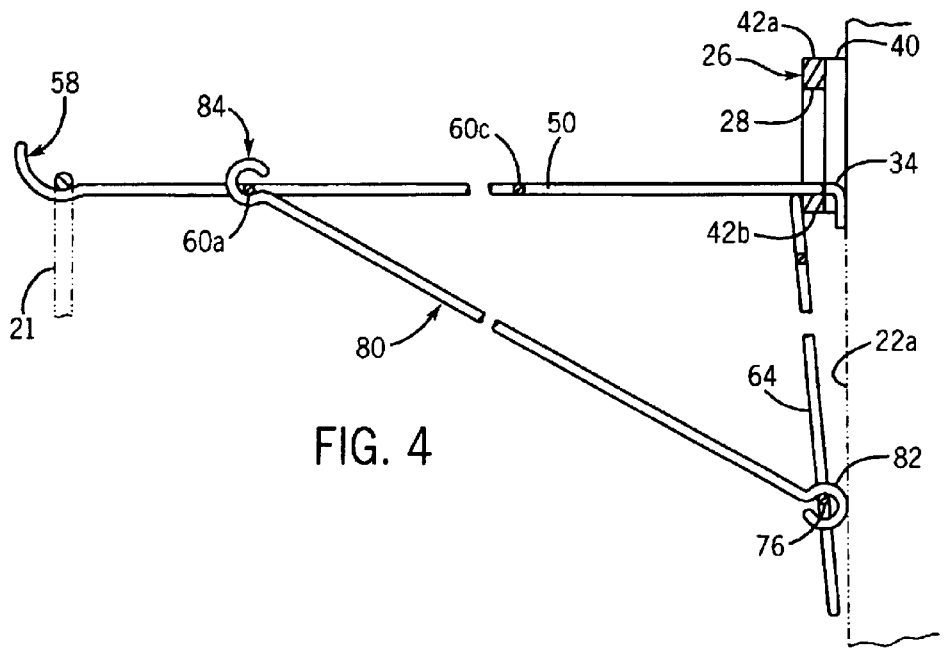
FIG. 4 is a cross-sectional view of the hanging device of the present invention taken along line 4—4 in FIG. 2.

Referring to FIG. 2, a hanging device in accordance with the present invention is generally designated by the reference numeral 20. It is intended that hanging device 20 be mountable on a vertical support 22, FIG. 1, such as a tree, lamp post, flag pole or the like in order to hang objects such as birdhouses, birdfeeders, or wind chimes therefrom. By way of example, in a depicted embodiment shown in FIG. 1, each, hanging device 20 supports a corresponding hanging planter 21 thereon.

Hanging device 20 includes a girding member or strap 26 having first and second ends 27a and 27b, respectively. Strap 26 is formed from a flexible material so as to allow strap 26 to be wrapped around vertical support 22 as hereinafter described. Strap 26 is defined by a first inner side 26a and a second outer side 26b. A series of apertures 28 are formed in strap 26 between the first and second ends 27a and 27b, respectively, thereof. Each aperture 28 extends between the inner surface 26a of strap 26 and the outer surface 26b of strap 26. Apertures 28 are generally rectangular in shape and form receptors for receiving second ends 34 and 36 of first support member 38, for reasons hereinafter described.

A plurality of projections or nubs 40 project from the inner surface 26a of strap 26. Each nub 40 extends between a upper edge 42a and lower edge 42b of strap 26. Nubs 40 are positioned between adjacent apertures 28 in strap 26. Each nub includes an inner surface 44 for engaging outer surface 22a of vertical support 22. Sidewalls 46a and 46b diverge from opposite sides of inner surfaces 44 of nubs 40 so as to interconnect inner surfaces 44 of nubs 40 to the inner surface 26a of strap 26. As best seen in FIG. 3, sidewalls 46a of nubs 40 and sidewalls 46b of adjacent nubs 40a define gaps 48 therebetween, for reasons hereinafter described.

First support member 38 of hanging device 20 is generally V-shaped and includes first and second arms 50 and 52, respectively. Arms 50 and 52 of first support member 38 have corresponding first ends 54 and 56, respectively, which are joined together to form hook 58 at the vertex of V-shaped first support member 38. As heretofore described, second ends 34 and 36 of arms 50 and 52, respectively, have hooks formed thereon for reasons hereinafter described. Arms 50 and 52 are further connected by a plurality of spaced cross members 60a–c.

Hanging device 20 further includes a vertical positioning member generally designated by the reference numeral 62. Vertical positioning member 62 includes first and second parallel support rods 64 and 66, respectively. Support rods 64 and 66 include first ends 68 and 70, respectively, and second, opposite hooked ends 72 and 74 (FIG. 3), respectively. Cross member 76 interconnects support rod 64 and 66 at a location adjacent corresponding first ends 68 and 70, respectively. Likewise, cross member 78 interconnects support rods 64 and 66 at a location adjacent corresponding hooked ends 72 and 74 of support rods 64 and 66, respectively.

As best seen in FIGS. 2–4, bracing rod 80 extends between cross member 76 of vertical positioning member 62 and one of the cross members 60a–60c of first support member 38. Bracing rod 80 includes first hooked end 82 which engages cross member 76 of vertical positioning member 62 and second hooked end 84 which engages one of the cross members 60a–60c of first support member 38 as selected by a user. By way of example, second hooked end 84 of bracing member 80 engages cross member 60a of first support member 38.

Referring to FIGS. 7–10, bracing member 90 may be used as an alternate structure for bracing rod 80. Bracing member 90 includes a first bracing rod 92 having a first hooked end (not shown) for engaging cross member 76 of vertical positioning member 62 and second opposite L-shaped end 94. Bracing member 90 further includes a second bracing rod 96 having a first end (not shown) for engaging one of the cross members 60a–60c of first support member 38 and a second opposite end 98 rigidly connected to an adjustment structure generally designated by the reference numeral 100.

Second end 98 of second bracing rod 96 is rigidly secured to mounting element 102 interconnected to a first end in which guide element 104 is interconnected to a second opposite end of adjustment structure 100. Guide element 104 includes a generally hooked-shaped guide portion 106 projecting perpendicular to first bracing rod 92. Guide portion 106 defines a generally circular guide 108 for slidably receiving first bracing rod 92 therethrough. Mounting element 102 and guide element 104 are interconnected by an adjustment element 110. Adjustment element 110 includes a longitudinally extending opening 112 therein. A plurality of hook-shaped teeth 114 project into longitudinal opening 112 in adjustment element 110, and define a plurality of corresponding end receiving areas 116. It can be appreciated that the L-shaped end 94 of first bracing rod 92 may be selectively seated in one of the end receiving areas 116 defined by corresponding teeth 114. Depending upon the end receiving area 116 in which L-shaped end 94 of bracing rod 92 is seated, the length of bracing member 90 is varied.

Figure 5:
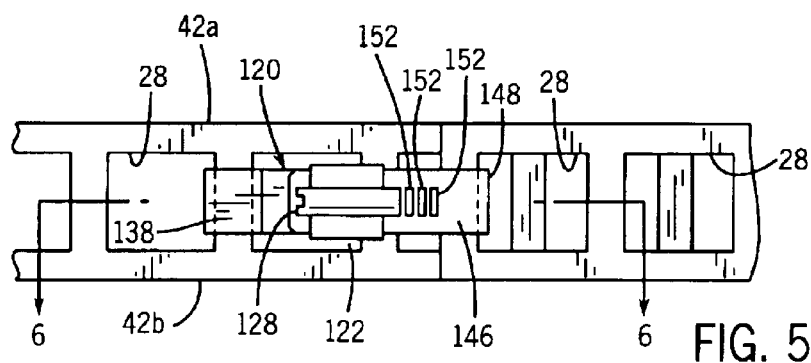
FIG. 5 is a side elevational view of the hanging device of the present invention taken along line 5—5 of FIG. 2.
Figure 6:
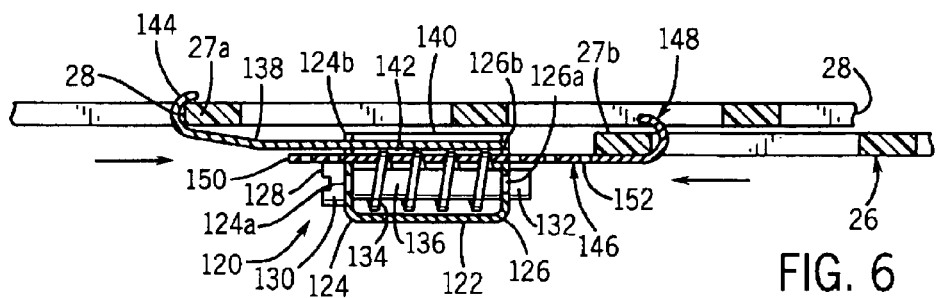
FIG. 6 is a cross-sectional view of the hanging device of the present invention taken along line 6—6 of FIG. 5.

As best seen in FIGS. 1 and 7, it is intended that strap 26 be wrapped around vertical support 22. Referring to FIGS. 5–6, a connection mechanism, generally designated by the reference numeral 120, may be provided for retaining strap 26 on vertical support 22. Connection mechanism 120 includes a hollow housing 122 having first and second end walls 124 and 126, respectively. End walls 124 and 126 include corresponding screw receipt openings 124a and 126a, respectively, therethrough which are in axial alignment with each other. Screw 128 extends through screw receipt openings 124a and 126a in housing 122. Screw 128 includes a first enlarged head 130 mounted on a first end thereof and a second enlarged head 132 mounted on a second, opposite end thereof such that shaft 136 of screw 128 is captured within the interior of housing 122. Threads 134 extend radially from shaft 136 of screw 128.

End walls 124 and 126 of housing 122 further include corresponding connection openings 124b and 126b, respectively. First connection element 138 extends through connection element opening 124b in end wall 124 of housing 122. Connection element 138 has a first end 140 affixed to the inner surface 142 of housing 122 and a second, opposite hooked end 144. Second connection element 146 includes a hook end 148 and a second opposite end 150. A plurality of longitudinally spaced slots 152 are provided in second connection element 146. Second connection element 146 extends through connection element openings 124b and 126b in end walls 124 and 126, respectively of housing 122 such that threads 134 of screw 128 are received within corresponding slots 152 in second connection element 146. By rotating screw 128, second connection element 146 travels on threads 134 of screw 128 such that hooked ends 144 and 148 are drawn towards each other. Similarly, by rotating screw 128 in the second, opposite direction, second connection element 146 travels on threads 134 of screw 128 such that hooked ends 144 and 148 are separated.

In operation, strap 26 is wrapped around vertical support 22. It can be appreciated that if strap 26 is positioned about a vertical support 22, such as a tree, for a prolonged period of time, the tree may grow into the gaps 48 between adjacent nubs 40. As a result, strap 26 may be retained on the tree for the prolonged time period without damaging the tree.

Connection mechanism 120 is positioned such that hooked end 148 of second connection element 146 extends through aperture 28 adjacent first end 27a of strap 26 so as to capture a portion of strap 26 therewith. Hooked end 144 of first connection element 138 is inserted through an aperture 28 in strap 26 adjacent second end 27b of strap 26 so as to capture a portion of strap 26 therein such that strap 26 is maintained on vertical support 22 in a semi-taunt relationship. Screw 128 is rotated in a first direction so as to draw hooked end 148 of second connection element 146 towards hooked end 144 of first connection element 138 so as to tighten strap 26 about vertical support 22.

With strap secured about vertical support 22, inner surfaces 44 of nubs 40 engage the outer surface 22a of vertical support 22. Second ends 34 and 36 of arms 50 and 52, respectively, are inserted into corresponding gaps 48 formed between adjacent nubs 40 and 40a so as to pivotably interconnect first support member 38 to strap 26. In addition, hooked ends 72 and 74 of support rod 64 and 66, respectively, of vertical positioning member 62 are inserted within the same gaps 48 as second ends 34 and 36 of arms 50 and 52, respectively, of first support member 38, FIG. 3. As described, vertical positioning member 62 depends from and is pivotably connected to strap 26.

In a depicted embodiment, second ends 34 and 36 of arms 50 and 52, respectively of first support member 38 extend through apertures 28 in strap 26. Similarly, hooked ends 72 and 74 of support rods 64 and 66, respectively, of vertical positioning members 62 extend through apertures 28 in strap 26. However, it is contemplated that second ends 34 and 36 of arms 50 and 52, respectively, of first support member 38 may be hung on upper edge 42a of strap 26 without deviating from the scope of the present invention. Similarly, hooked ends 72 and 74 of support rods 64 and 66, respectively, of vertical positioning member 62 may be hung over upper edge 42a of strap 26 without deviating from the scope of the present invention.

In the first embodiment, FIGS. 2–4, bracing rod 80 extends between cross member 76 of vertical positioning member 62 and a user selected cross member 60a–60b of first support member 38. First hooked end 82 of bracing rod 80 pivotably engages cross member 76 of vertical positioning member 62 and second hooked end 84 pivotably engages one of the cross members 60a–60c of the first support member 38. In the depicted embodiment, second hooked end 84 of bracing member 80 engages cross member 60a of support member 38. As described, an object such as hanging planter 21 may be supported on hook 58 of first support member 38. It can be appreciated that a single strap 26 may be used to support multiple first support members 38, vertical positioning members 62, and bracing rods 80 so as to allow for the hanging of multiple objects from vertical support 22.

As heretofore described, bracing rod 80 may be replaced with bracing member 90. Referring to FIG. 8, it can be appreciated that by modifying the length of bracing member 90, the position of first support member 38 of hanging device 20 may be varied. In a preferred embodiment, it is contemplated the length of bracing member 90 be adjusted in order that first support member 38 be generally horizontal in a configuration better suited to support the objects hung thereon.

While principles of this invention have been described in connection with specific embodiments, it should be understood that these descriptions are made only by way of example and are not intended to limit the scope of the invention.

I claim:

1. A landscape apparatus for hanging an object on a vertical support, comprising:
   a girding member having first and second sides;
   a pair of spaced, solid nubs projecting from a first side of the girding member, the nubs defining a gap;
   a first support member including a first end having a first portion pivotably receivable in the gap and a second end, the first support member having a first cross-member;
   a pair of vertical positioning members extending from the girding member, the pair of vertical positioning members having a first cross-member; and
   a second support member extending between the first cross-member of the first support member and the first cross-member of the pair of vertical positioning members.

2. The landscape apparatus of claim 1, wherein the girding member includes an upper edge and a lower edge, and the nubs extend between the upper edge and the lower edge of the girding member.

3. The landscape apparatus of claim 2 wherein the girding member includes a plurality of gaps between a first end and second end, and wherein the first and second end and at least a portion of the plurality of gaps overlap.

4. The landscape apparatus of claim 2 further comprising a connection mechanism to releasably retain the girding member on the vertical support, the mechanism having a first and second hooked end to insert through two of the plurality of gaps in the girding element, wherein the mechanism draws the first hooked end toward the second hooked end so as to tighten the girder member about the vertical support.

5. The landscape apparatus of claim 2 wherein the second support member is adjustable between a first length and a second, greater length.

6. The landscape apparatus of claim 2 wherein the girding member includes a third nub projecting from the first side thereof, the third nub partially defining a second gap and wherein the first end of the first support member has a second portion pivotably receivable in the second gap.

7. The landscape apparatus of claim 6 wherein the first and second portions of the first end of the first support member are interconnected by the first cross-member.

8. The landscape apparatus of claim 7 further comprising an attachment structure to detachably connect the first cross-member of the first support member and the second support member.

9. The landscape apparatus of claim 2 wherein the first cross-member of the pair of vertical positioning members is configured for removably supporting an end of the second support member.

10. The landscape apparatus of claim 8 wherein the second end of the first support member includes a hook.

11. A landscape apparatus for hanging an object on a vertical support, comprising:

a strap for encircling the vertical support, the strap having an inner surface;

at least two spaced, solid protrusions projecting from the inner surface of the strap for engaging the vertical support and spacing the strap therefrom, the protrusions defining a gap;

an elongated support including a first end having a portion receivable between the at least two spaced, rigid projections and a second end, the elongated support having a first cross-member;

a pair of vertical members depending from the strap, the pair of vertical members having a first cross-member; and a bracing member extending between the first cross-member of the elongated support and the first cross-member of the pair of vertical members.

12. The landscape apparatus of claim 11, wherein the strap includes an upper edge and a lower edge, and the nubs extend between the upper to the lower edge.

13. The landscape apparatus of claim 12 further comprising a tensioning device interconnected to the strap for adjustably and releasably mounting the strap about the vertical support.

14. The landscape apparatus of claim 12, wherein the bracing member includes a hook for pivotably connecting the bracing member to the first cross member of the pair of vertical members.

15. The landscape apparatus of claim 14 wherein the bracing member includes a hook for pivotably connecting the bracing member to the first cross member of the elongated support.

16. The landscape apparatus of claim 12 wherein the second end of the elongated support includes a hook for supporting the object to be hung.

17. A landscape apparatus for hanging an object on a vertical support, comprising:

a support arm having a first, connecting end and a second, hooked end for receiving the object to be hung thereon, the support arm having at least one cross-member;

a belt member extendable about the vertical support as to capture the first, connecting end of the support arm and to pivotably connect the support arm to the vertical support;

a pendant support member depending from the belt member and having at least one cross-member;

an adjustable bracing member extending between the at least one cross-member of the pendant support member and the at least one cross member of the support arm for maintaining the support arm in a user-selected position; and a plurality of solid projections extending from a first side of the belt member and engaging the vertical support for spacing the belt member from the vertical support, the projections defining first and second gaps between the belt member and the vertical support; and wherein the connecting end of the support arm includes first and second spaced connection elements, each connection element engaging the belt member and being receivable in a corresponding gap so as to allow the support arm to pivot with respect to the vertical support.

18. The landscape apparatus of claim 17 wherein the support arm is generally V-shaped.

19. The landscape apparatus of claim 17 further comparing a clamping mechanism interconnected to the belt member for retaining the belt member on the vertical support.

20. The landscape apparatus of claim 17, wherein the belt member includes an upper edge and a lower edge, and the projections extend from the upper edge to the lower edge of the belt member.

* * * * *